(No Model.)
J. M. JAGEL.
ELECTRIC SUBWAY.
No. 349,797. Patented Sept. 28, 1886.
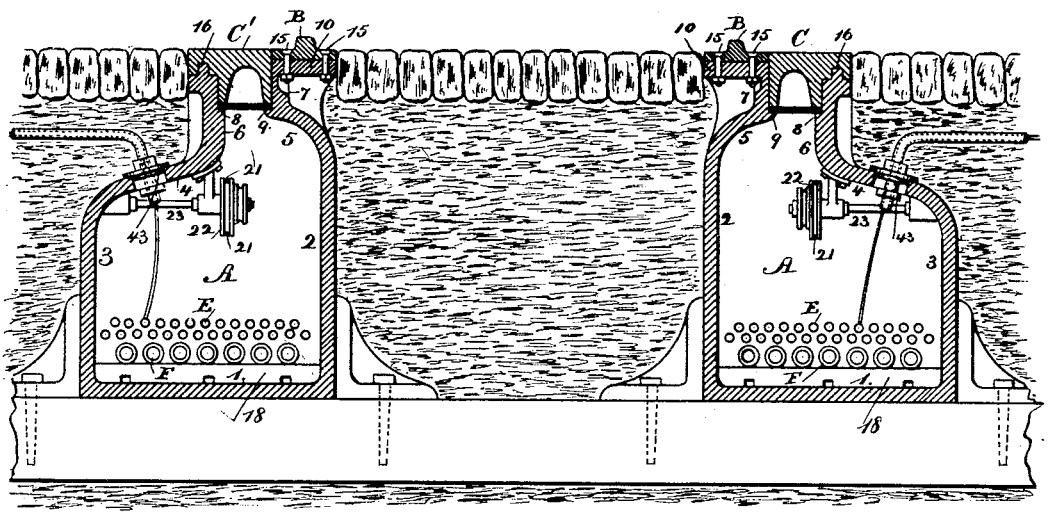
Witnesses
Chas H Smith
J. Stail
Inventor
Julius M Jagel
per Lemuel W. Serrell
atty

UNITED STATES PATENT OFFICE.

JULIUS M. JAGEL, OF BROOKLYN, NEW YORK.

ELECTRIC SUBWAY.

SPECIFICATION forming part of Letters Patent No. 349,797, dated September 28, 1886.

Application filed March 1, 1886. Serial No. 193,617. (No model.)

*To all whom it may concern:*

Be it known that I, JULIUS M. JAGEL, of Brooklyn, in the county of Kings and State of New York, have invented an Improvement in Electric Subways, of which the following is a specification.

Hollow railway-rails have been made for the reception of electric conductors; but the rail had to be removed to give access to the conduit containing the conductors.

My invention is for furnishing a continuous conduit that can be opened all along the top, for the reception of cables, pneumatic tubes, or wires, without disturbing the railway-track; for supporting railway-rails in a firm and rigid manner without interfering with the access to the conduit for inserting or removing the conductors, and for allowing the rails to be attached or removed at pleasure; for drawing into the conduit insulated electric conductors as required from time to time, and for allowing of the lateral connections to be made for branch wires.

In the drawings, Figure 1 is a cross-section of the conduit, representing the same as complete. Fig. 2 is a section in larger size of the device for drawing in additional wires or cables. Fig. 3 is a section longitudinally at one of the access-openings, and Fig. 4 is a section of one of the short removable covers.

The conduit A is made of the bottom 1, sides 2 and 3, compound curved roof 4 5, vertical cheeks 6 7, bearing-flanges 8 9 for the cover, and tread-plate 10 for the track-rail. These conduits are preferably of iron, cast in suitable lengths, and the ends are brought together, there being end flanges, 11, at one end of each conduit, receiving within them the end of the next length. Rubber strips should be placed between the ends, as at 12, and the bolts 13 pass through the metal, and are made tight by washers beneath the heads, and the holes in the flanges are elongated to allow for expansion and contraction. The tread-plate 10 is about the same width as the flanges of the rail B, and there are openings in the tread-plate for the passage of the bolts 15, by which such rails B are secured. There may be keys inserted to hold these bolts down to place, or there may be nuts on the lower ends. In either case there are lateral openings beneath the tread-plate to give access to the nuts or keys; or the tread-plate may be supported by flanges extending above the roof 5 to the under side of the tread-plate, and placed sufficiently near each other to firmly support such tread-plate. These tread-plates are at one side of the longitudinal opening and above one side of the box, so that the weight of the cars is supported directly by the side of the box. The cover C rests upon the flanges 8 and 9, there being a packing of rubber or similar material between the metallic surfaces to render the joint water-tight, and the rib and groove at 16 serve to render the connection more reliable. The cover C may have bolts passing into the cheek 6 to hold the same firmly, and this cover is preferably corrugated or roughened on its upper surface, and the ends of the covers lap upon each other, and are packed or otherwise rendered water-tight. The covers C are in lengths that are easily handled; but at suitable distances apart—say about every three hundred feet—access-openings are provided with short removable covers C', made similar to the covers C, so that by removing such cover C' access can be had to the wires. It is to be understood that when the covers C are removed large cables containing numerous wires can be laid into the conduit, as at E, or pneumatic tubes can be introduced, as at F. These should be laid in the bottom of the conduit, and the smaller cables or conductors, E, should rest upon them. The bottom of the conduit is provided with ribs or supports 18, placed at short intervals, to keep the tubes and conductors up from the bottom, and these supports are to be notched, to allow any water that may get in to run along to a low place and be taken off to a sewer.

In order to allow for the insertion of conductors from time to time, I provide the endless wire ropes 21, passing around the pulleys 22, that are upon gudgeons 23, fixed in the conduits at the access-openings, and there is an upper tube, 26, of iron, through which the wire rope passes, and a lower split case, 27, also for the wire rope to pass through, and these pulleys 22 are to be revolved by a band, 28, to a pulley, 29, in a frame above-ground, as shown in Fig. 3, such pulley 29 being turned by a crank. Upon the wire rope a suitable appliance, 42, is attached for connecting to the conductor or cable. This appliance hangs down through the slot in the split case 27. The case 27 and tube 26 are supported at intervals by hangers 30. Hand-hole openings are cast in the conduits at suitable distances apart, and by having these in the arched roof 4 they are easy of access, and the covers 43 of these hand-holes can be attached by tubular bolts, as shown, so that the insulated conductors can be taken off through small iron pipes screwed onto the tubular bolt.

It is to be understood that both rails of the track are to be laid on conduits, so as to render the track uniform and increase the capacity for the reception of conductors, and one conduit may receive pneumatic tubes and electric-light wires, and the other telegraph-wires and telephone wires and cables.

I claim as my invention—

1. The conduit for electric conductors, formed of ranges of metal boxes bolted together, each box being formed of the bottom 1, sides 2 and 3, the curved roof portion, with the vertical cheeks forming the sides of the longitudinal openings, and the tread-plates 10, for the reception of railway-rails at the top and on one side of the longitudinal opening, in combination with the removable covers, substantially as set forth.

2. The combination, with the conduit for electric conductors, of the pulleys, the endless wire rope, the tube to support the same, and the split case through which the rope passes for drawing in the conductor, substantially as set forth.

3. A combined sleeper for railway-rails and a conduit for electric conductors, composed of metallic boxes united together end to end, and having longitudinal openings in the same, and tread-plates at the sides of the openings for the reception of the railway-rails, in combination with the removable covers in the longitudinal openings, whereby access is given to the conduit without disturbing the rails, and the rails are removable from the tread-plates independent of the covers, substantially as specified.

4. A combined sleeper for a railway-track and a conduit for electric conductors, formed of a range of cases, each having the sides arching toward each other, a tread-plate for the railway-rails, and a longitudinal opening with parallel sides and covers having parallel edges that fit tightly into the longitudinal opening, substantially as set forth.

Signed by me this 20th day of February, A. D. 1886.

JULIUS M. JAGEL.

Witnesses:
 GEO. T. PINCKNEY,
 WILLIAM G. MOTT.